(12) United States Patent
Kuo et al.

(10) Patent No.: US 6,639,238 B2
(45) Date of Patent: Oct. 28, 2003

(54) PHOTO INTERRUPTER WITH DUAL-DIRECTION DETECTION ABILITY

(75) Inventors: Yao Lung Kuo, Sanchung (TW); Cheng Fang Chen, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 0 days.

(21) Appl. No.: 10/052,515

(22) Filed: Jan. 23, 2002

(65) Prior Publication Data
US 2003/0136899 A1 Jul. 24, 2003

(51) Int. Cl.[7] .............................................. G02B 27/00
(52) U.S. Cl. ...................................... 250/551; 250/239
(58) Field of Search ........................ 250/551, 559.12, 250/221, 222.1, 239, 227.21, 227.22; 356/638, 436, 429; 340/555, 556, 557; 200/116, 115, 18, 160, 61.02

(56) References Cited

U.S. PATENT DOCUMENTS

| | | | |
|---|---|---|---|
| 5,156,464 A | * 10/1992 | Sakai | 400/56 |
| 5,200,608 A | * 4/1993 | Kitajima | 250/221 |
| 5,672,884 A | * 9/1997 | Muhleck et al. | 250/551 |
| 5,700,003 A | * 12/1997 | Sung | 271/110 |
| 6,050,471 A | * 4/2000 | Yagi | 227/119 |
| 6,102,389 A | * 8/2000 | Sakurai et al. | 271/121 |
| 6,140,635 A | * 10/2000 | Kazumi et al. | 250/221 |
| 6,179,498 B1 | * 1/2001 | Tsukada | 400/582 |
| 6,409,043 B1 | * 6/2002 | Fujita et al. | 271/10.03 |

FOREIGN PATENT DOCUMENTS

| | | | |
|---|---|---|---|
| JP | 11180589 A | * 7/1999 | |
| JP | 200211809 A | * 8/2000 | |

* cited by examiner

*Primary Examiner*—Christopher W. Fulton
*Assistant Examiner*—Madeline Gonzalez
(74) *Attorney, Agent, or Firm*—Rosenberg, Klein & Lee

(57) ABSTRACT

A photo interrupter with dual-direction detection ability comprises a main body, a pointer, a first spring and a second spring. The main body has retainers for pivotally clamping the pointer such that the pointer can rotate both in counter-clockwise and clockwise directions. The pointer has a baffle in the recess to block a light from a light emitter to a light receiver and a pendulum end to sense the presence of paper. The first spring provides a counterclockwise restoring force for the pointer and the second spring provide a clockwise restoring force for the pointer such that the photo interrupter can sense paper fed in both directions.

6 Claims, 8 Drawing Sheets

PHOTO INTERRUPTER WITH DUAL-DIRECTION DETECTION ABILITY

FIELD OF THE INVENTION

The present invention relates to a photo interrupter with dual-direction detection ability, especially to a photo interrupter with dual-direction detection ability to sense the paper fed in different directions.

BACKGROUND OF THE INVENTION

The paper detector used in conventional printer generally comprises a photo interrupter with paper detection function. As shown in FIGS. 1 and 2, a prior art photo interrupter with single-direction detection function comprises a main body 1a, a pointer 2a and a spring 3a. The main body 1a comprises a recess 13a between a light emitter 11a and a light receiver 12a, and retainers 14a and 15a on both sides of the recess 13a. The pointer 2a has two rotational pivots 21a and 22a on both sides thereof and the rotational pivots 21a and 22a are pivotally arranged on the retainers 14a and 15a. The pointer 2a has a baffle 23a at front side thereof and located in the recess 13a to block light from the light emitter 11a. Moreover, the baffle 23a is abutted to the main body 1a such that the pointer 2a has counterclockwise rotation only. The pointer 2a further has a pendulum end 24a on bottom thereof to detection the presence of paper. The spring 3a is looped on the rotational pivot 22a on one side of the pointer 2a to provide a reverse torque to the pointer 2a. The spring 3a has one side fixed to a slit 25a of the pointer 2a and another side lay on the main body 1a. When the pendulum end 24a of the pointer 2a is driven to move in counterclockwise direction, the spring 3a is distorted to produce a reverse torque. When the force exerted on the pendulum end 24a of the pointer 2a is not present, the pointer 2a is returned to original position due to the reverse torque of the spring 3a. However, the pointer 2a has only rotation in counterclockwise direction and cannot provide dual-direction detection function. Therefore, the photo interrupter is not-feasible for double-side printing application.

FIGS. 3 and 4 show another prior art photo interrupter with double-direction detection function, wherein the baffle 23a of the pointer 2a is not lay on the main body 1a. The spring 3a has two ends fixed to a hook 16a on the main body 1a and fixed to the slit 25a of the pointer 2a such that the pointer 2a can rotate in both clockwise and counterclockwise directions. However, this imposed restrict demand on design of the spring 3a. Once the torque requirement of the pointer 2a is changed, the design of the spring 3a should be renewed. Moreover, the single spring 3a can provide single-valued torque, which is not suitable for pointer 2a requiring different torques along different rotation directions.

SUMMARY OF THE INVENTION

It is an object of the present invention to provide a photo interrupter with dual-direction detection ability, wherein the spring has simple design with consideration of rotation direction only.

It is another object of the present invention to provide a photo interrupter with dual-direction detection ability, wherein the restoring torque for respective direction can be easily changed.

It is still another object of the present invention to provide a photo interrupter with dual-direction detection ability, wherein photo interrupter has more than one springs to provides corresponding torque for respective direction.

To achieve above object, the present invention provides a photo interrupter with dual-direction detection ability, which comprises a main body, a pointer, a first spring and a second spring. The main body has retainers for pivotally clamping the pointer such that the pointer can rotate both in counterclockwise and clockwise directions. The pointer has a baffle in the recess to block a light from a light emitter to a light receiver and a pendulum end to sense the presence of paper. The first spring provides a counterclockwise restoring force for the pointer and the second spring provide a clockwise restoring force for the pointer such that the photo interrupter can sense paper fed in both directions.

The various objects and advantages of the present invention will be more readily understood from the following detailed description when read in conjunction with the appended drawing, in which:

DETAILED DESCRIPTION OF THE INVENTION

Figure 1:
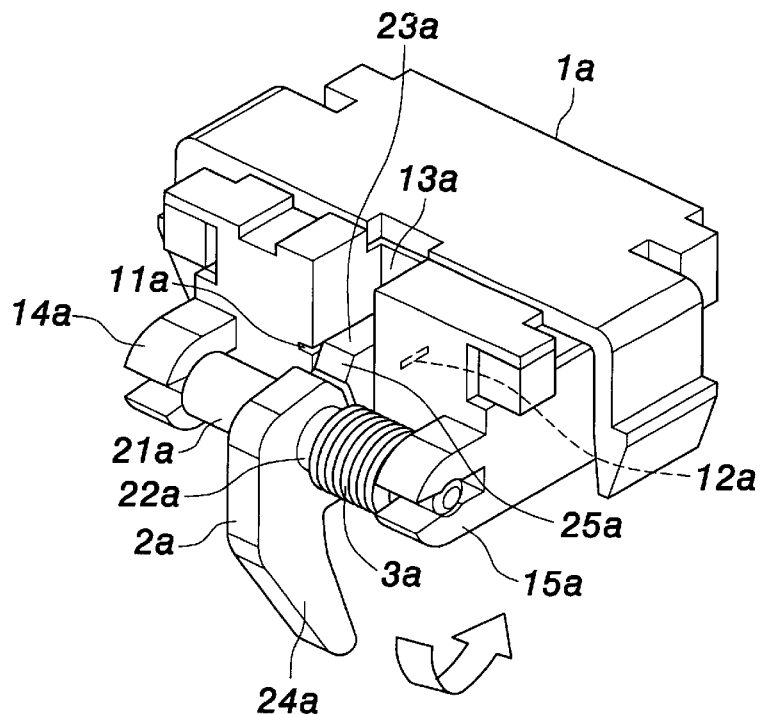
FIG. 1 shows a prior art photo interrupter with single-direction detection function.
Figure 2:
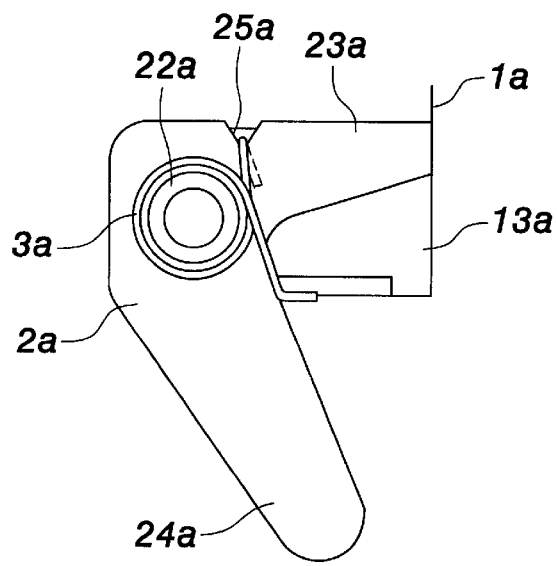
FIG. 2 shows a sectional view of the pointer in FIG. 1.
Figure 3:
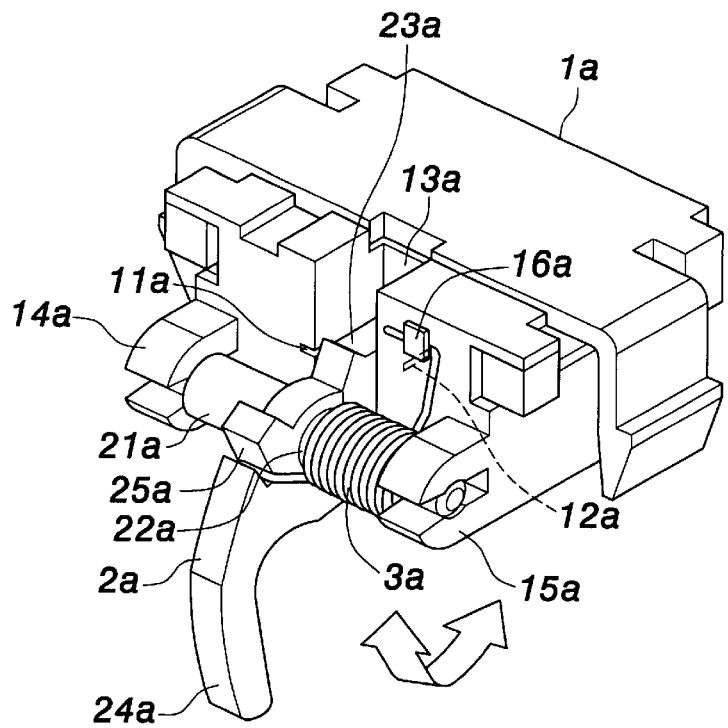
FIG. 3 shows another prior art photo interrupter with double-direction detection function.
Figure 4:
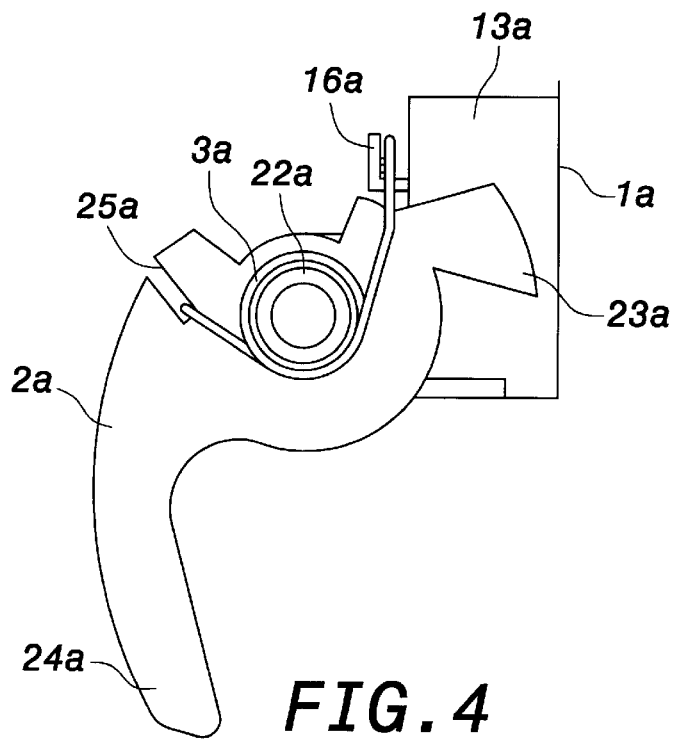
FIG. 4 shows a sectional view of the pointer in FIG. 3.
Figure 5:
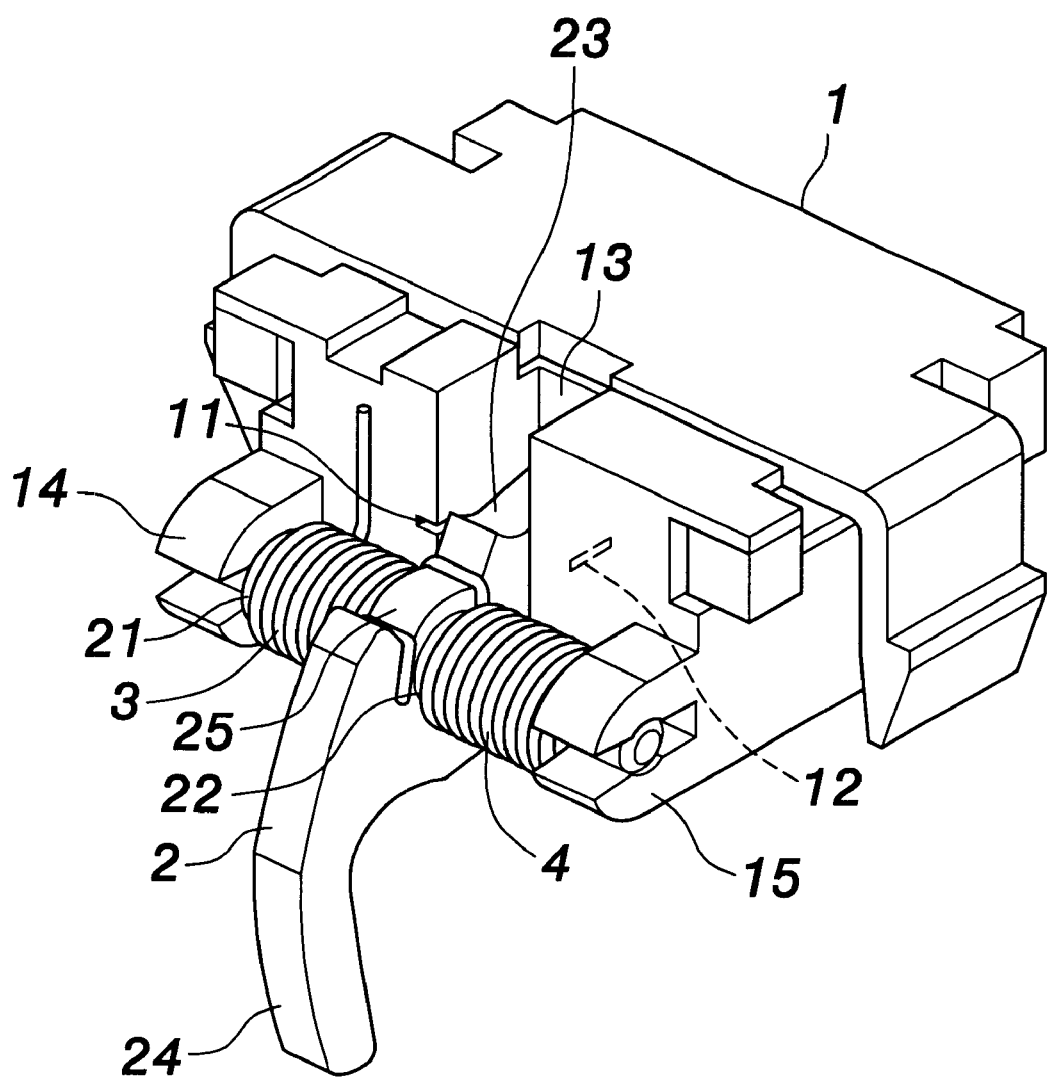
FIG. 5 shows a perspective view of the present invention.

FIG. 5 shows the photo interrupter with dual-direction detection ability of the present invention. The photo interrupter can detect different paper feeding directions and comprises a main body 1, a pointer 2, a first spring 3 and a second spring 4.

The main body 1 is used to detection the blocking condition of light, wherein a recess 13 is provided between a light emitter 11 for emitting light and a light receiver 12 for receiving light. Moreover, the main body 1 has lug-shaped retainers 14 and 15 on both sides of the recess 13.

The pointer 2 has two rotational pivots 21 and 22 on both sides thereof and the rotational pivots 21 and 22 are pivotally arranged on the lug-shaped retainers 14 and 15, whereby the pointer 2 can rotate in both clockwise and counterclockwise directions on the main body 1. The pointer 2 has baffle 23 on front end thereof and a pendulum end 24 on bottom end thereof, wherein the baffle 23 is placed in the recess 13 when the pointer 2 is at rest and blocks the light from the light emitter 11. The pendulum end 24 can sense different paper feeding directions and move the pointer 2 in clockwise and counterclockwise directions, respectively.

Figure 6:
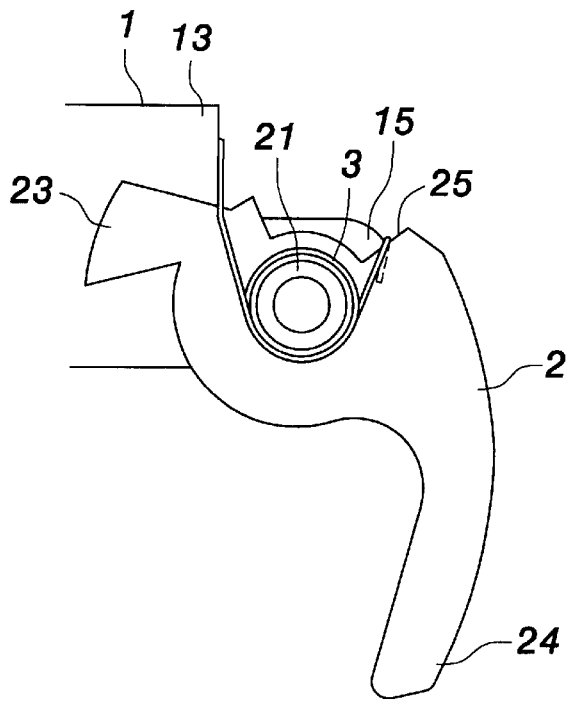
FIG. 6 shows a sectional view of the present invention.

As shown in FIG. 6, the first spring 3 is looped on the rotational pivot 21 with one movable end lay on the main body 1 and one fixed end clamped in the slit 25 of the pointer 2. Therefore, the first spring 3 provide a counterclockwise restoring force for the pointer 2.

Figure 7:
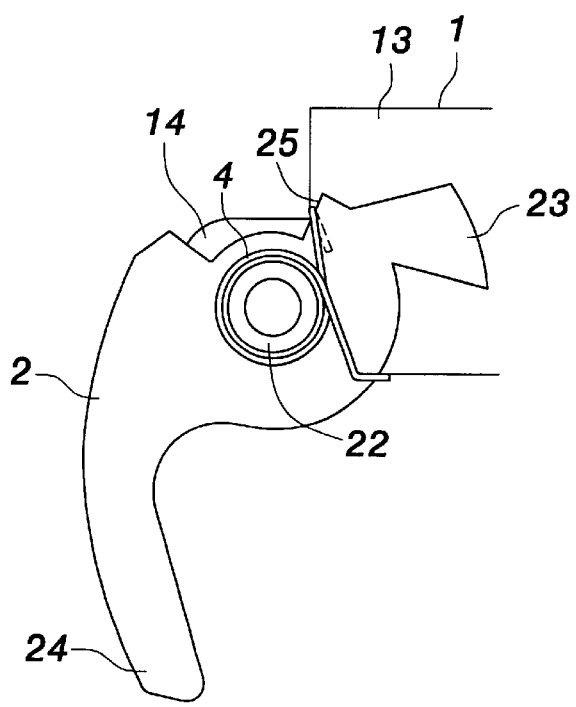
FIG. 7 shows another sectional view of the present invention.

As shown in FIG. 7, the second spring 4 is looped on the rotational pivot 22 with one movable end lay on the main body 1 and one fixed end clamped in the slit 25 of the pointer 2. Therefore, the second spring 4 provide a clockwise restoring force for the pointer 2.

Figure 8:
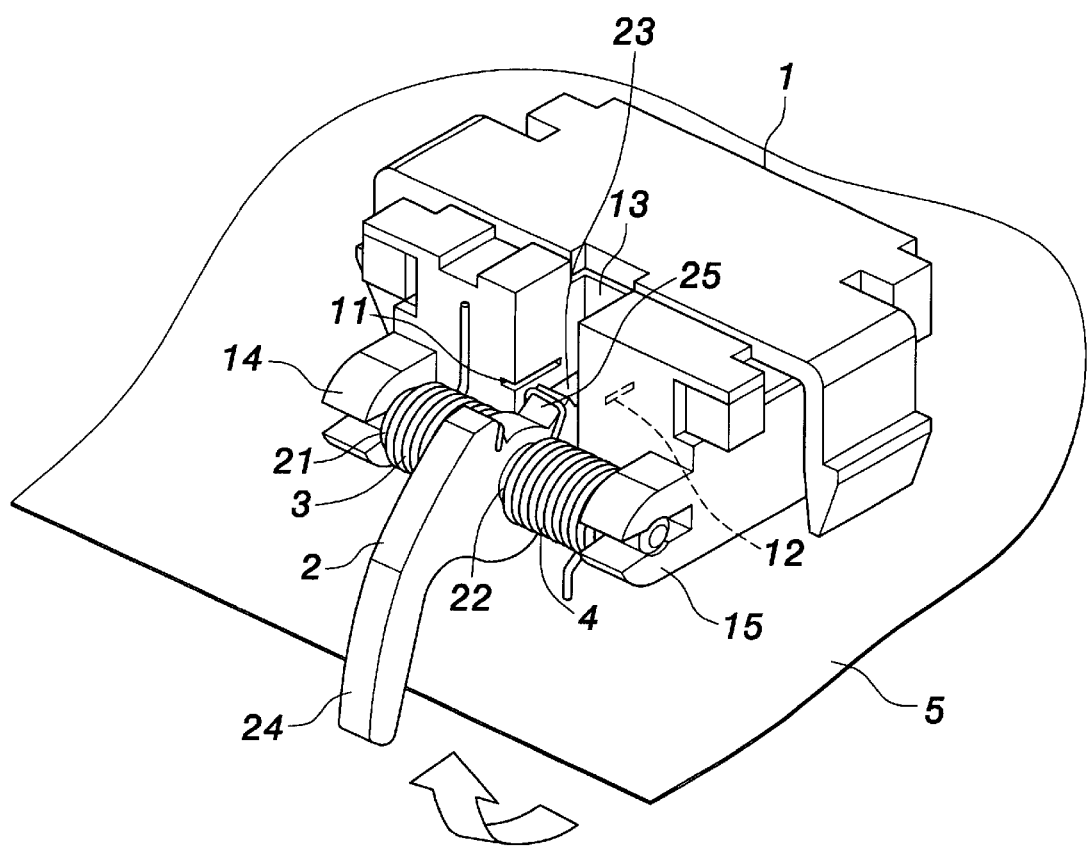
FIG. 8 shows that the pointer is subjected to a clockwise force.
Figure 9:
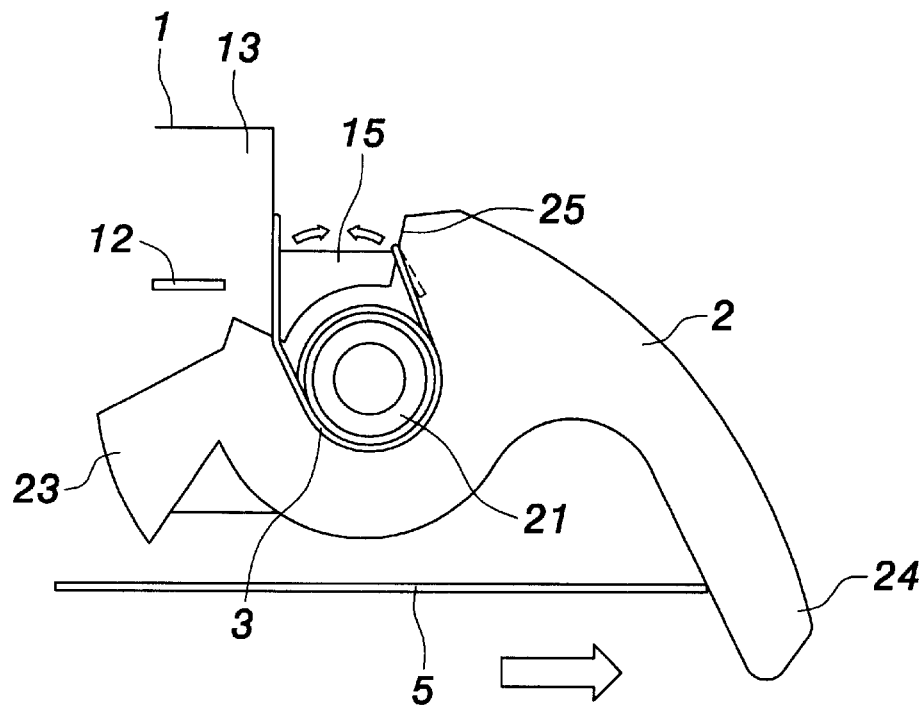
FIG. 9 shows a sectional view of the pointer in FIG. 8.
Figure 10:
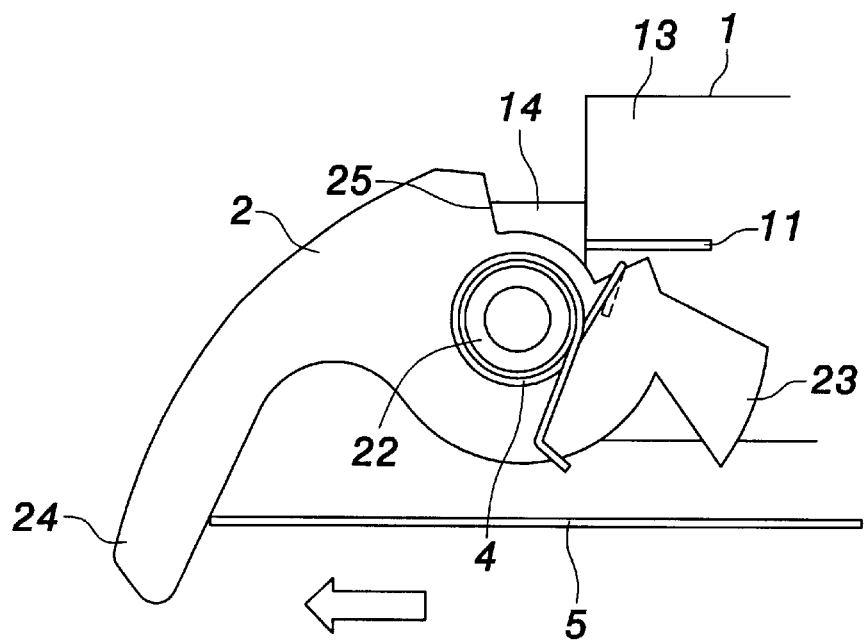
FIG. 10 shows another sectional view of the pointer in FIG. 8.

With reference to FIGS. 8 to 10, the pointer 2 is subjected to a clockwise driving force from the paper 5 when the paper 5 is fed from rear side of the photo interrupter. At this time, the light receiver 12 detects the light from the light emitter 11 and recognizes the presence of the paper 5. The first spring 3 is distorted to produce a counterclockwise restoring force for the pointer 2. The second spring 4 is moved with the pointer 2 and generates no torque force. After the paper 5 passes the pointer 2, the counterclockwise restoring force of the first spring 3 will restore the pointer 2 to original direction.

Figure 11:
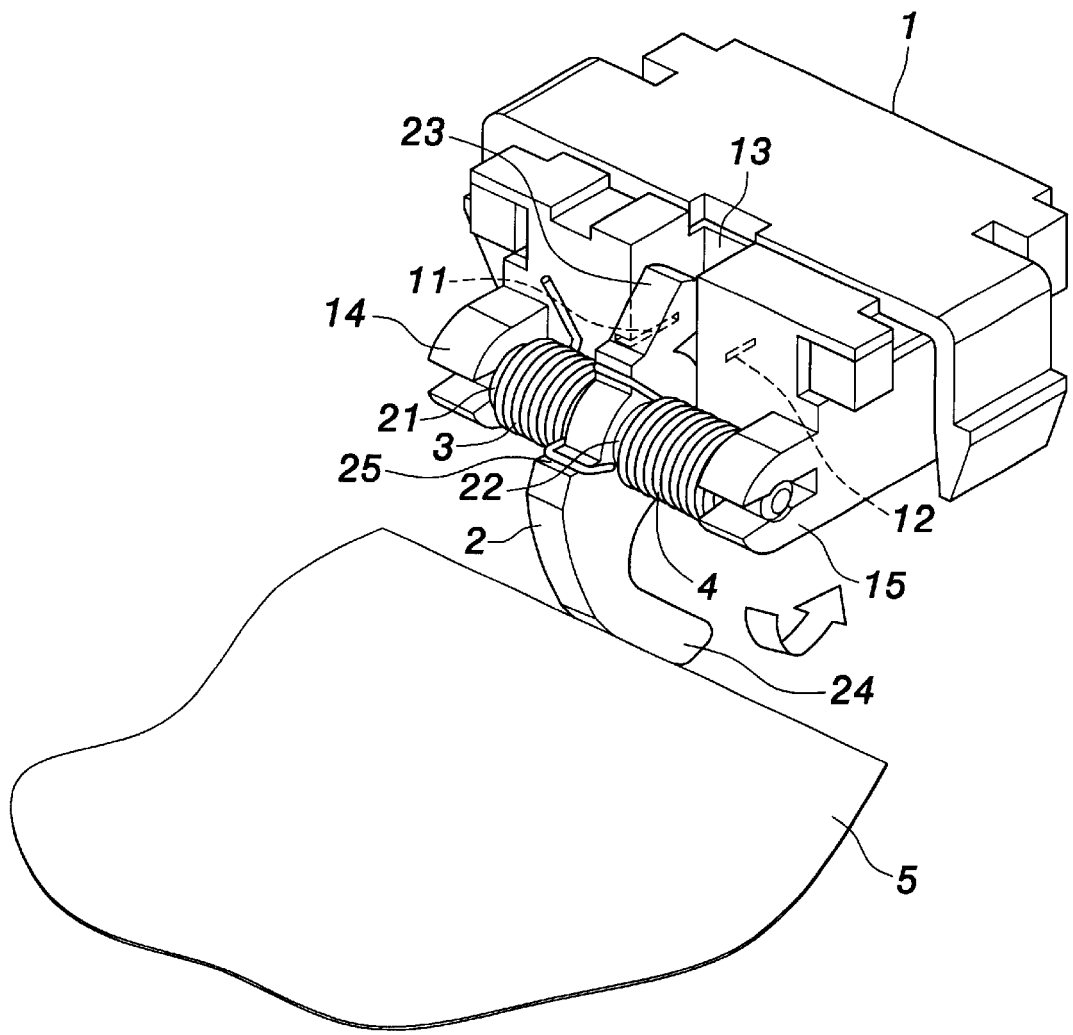
FIG. 11 shows that the pointer is subjected to a counterclockwise force.
Figure 12:
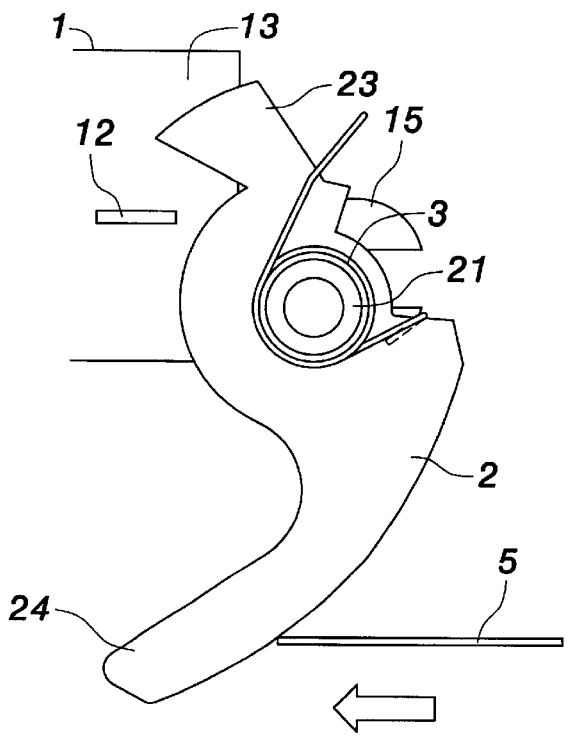
FIG. 12 shows a sectional view of the pointer in FIG. 11.
Figure 13:
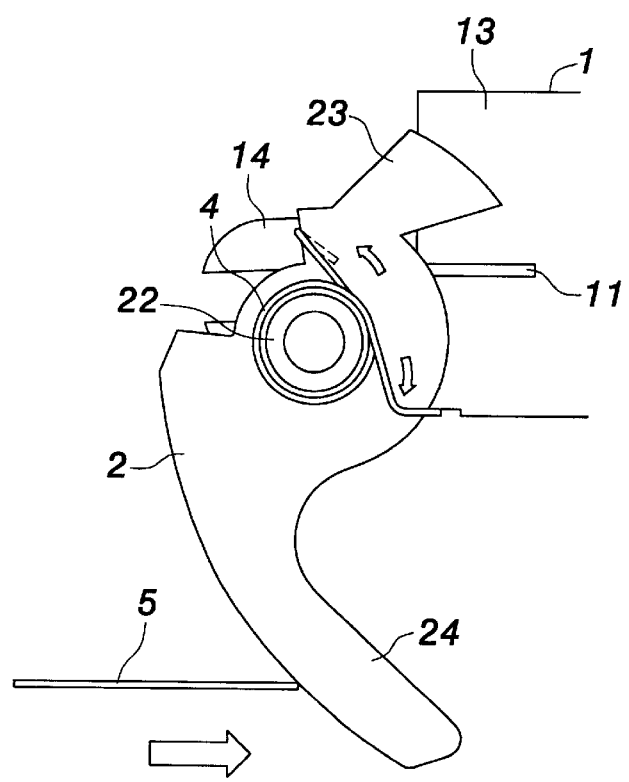
FIG. 13 shows another sectional view of the pointer in FIG. 11.

With reference to FIGS. 11 to 13, the pointer 2 is subjected to a counterclockwise driving force from the paper 5 when the paper 5 is fed from front side of the photo interrupter. At this time, the light receiver 12 detects the light from the light emitter 11 and recognizes the presence of the paper 5. The second spring 4 is distorted to produce clockwise restoring force for the pointer 2. The first spring 3 is moved with the pointer 2 and generates no torque force. After the paper 5 passes the pointer 2, the clockwise restoring force of the second spring 4 will restore the pointer 2 to original direction.

To sum up, the photo interrupter with dual-direction detection ability of the present invention has following advantages:

(1) The restoring force of the pointer is provided by two springs.

(2) The two springs are independent to provide restoring force to respective feeding direction.

(3) The photo interrupter can provide different restoring torques for different paper feeding directions.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

We claim:

1. A photo interrupter with dual-direction detection ability, comprising:
   main body for detecting light interruption and having a light emitter, a light receiver, a recess between the light emitter and the light receiver, and two retainers respectively disposed on both sides of the recess;
   a pointer having two rotational pivots respectively disposed on both sides thereof and pivotally arranged on the retainers, the pointer having a baffle on a front end thereof and a pendulum end on a rear end thereof, wherein the baffle is placed in the recess;
   a first spring looped on the rotational pivot on one side of the pointer and having a movable end disposed on the main body and a fixed end clamped in the pointer, the first spring providing a first predetermined torque in a first direction;
   a second spring looped on the rotational pivot on another side of the pointer and having a movable end disposed on the main body and a fixed end clamped in the pointer, the second spring providing a second predetermined torque in a second direction, the second direction being opposite the first direction and the second predetermined torque being different than the first predetermined torque.

2. The photo interrupter with dual-direction detection ability as in claim 1, wherein the retainers are lug-shaped.

3. The photo interrupter with dual-direction detection ability as in claim 1, wherein the pointer has slits for clamping the first spring and the second spring.

4. The photo interrupter with dual-direction detection ability as in claim 1, wherein the first spring provides a counterclockwise restoring force for the pointer.

5. The photo interrupter with dual-direction detection ability as in claim 1, wherein the second spring provides a clockwise restoring force for the pointer.

6. A photo interrupter with dual-direction detection ability, comprising:
   a main body for detecting light interruption and having a light emitter, a light receiver, a recess between the light emitter and the light receiver, and two retainers respectively disposed on both sides of the recess;
   a pointer having two rotational pivots respectively disposed on both sides thereof and pivotally arranged on the retainers, the pointer having a baffle on a front end thereof and a pendulum end on a rear end thereof, the baffle being disposed in the recess and being selectively displaceable from a first position to a second position or from the first position to a third position, the third position being in an opposite direction from the second position;
   a first spring looped on the rotational pivot on one side of the pointer and having a movable end disposed on the main body and a fixed end secured to the pointer for providing a return force to restore the baffle from the second position to the first position, the movable end of the first spring being displaced with the pointer when the baffle is displaced between the first position and the third position; and
   a second spring looped on the rotational pivot on another side of the pointer and having a movable end disposed on the main body and a fixed end secured to the pointer for providing a return force to restore the baffle from the third position to the first position, the movable end of the second spring being displaced with the pointer when the baffle is displaced between the first position and the second position.

* * * * *